(12) United States Patent
Cosp Villa

(10) Patent No.: US 10,098,359 B2
(45) Date of Patent: Oct. 16, 2018

(54) PORTIONING-TWISTING MACHINE FOR PRODUCING SAUSAGES

(71) Applicant: EQUIPAMIENTOS CARNICOS, S.L., Barcelona (ES)

(72) Inventor: Joan Ramon Cosp Villa, Barcelona (ES)

(73) Assignee: Equipamientos Carnicos, S.L., Barcelona (ES)

( * ) Notice: Subject to any disclaimer, the term of this patent is extended or adjusted under 35 U.S.C. 154(b) by 0 days.

(21) Appl. No.: 15/585,930

(22) Filed: May 3, 2017

(65) Prior Publication Data

US 2017/0318825 A1 Nov. 9, 2017

(30) Foreign Application Priority Data

May 4, 2016 (ES) .............................. 201630552 U

(51) Int. Cl.
*A22C 11/10* (2006.01)
*A22C 11/02* (2006.01)
*A22C 11/04* (2006.01)

(52) U.S. Cl.
CPC .......... *A22C 11/10* (2013.01); *A22C 11/0209* (2013.01); *A22C 11/04* (2013.01); *A22C 2011/101* (2013.01)

(58) Field of Classification Search
CPC .................................. A22C 11/00; A22C 11/10
USPC ........... 452/21–26, 30–32, 35–37, 46–48, 51
See application file for complete search history.

(56) References Cited

U.S. PATENT DOCUMENTS

| 8,137,167 B2* | 3/2012 | Baechtle | A22C 11/0218 452/36 |
| 8,210,911 B2* | 7/2012 | Kibler | A22C 11/0263 452/32 |
| 8,241,096 B1* | 8/2012 | Oxley | A22C 11/10 452/32 |
| 8,277,293 B2* | 10/2012 | Maile | A22C 11/0263 452/35 |
| 8,342,916 B2* | 1/2013 | Simpson | A22C 11/0209 452/31 |
| 8,398,467 B2* | 3/2013 | Vila Bonas | A22C 11/0209 452/42 |

(Continued)

FOREIGN PATENT DOCUMENTS

ES 1070476 U 9/2009

*Primary Examiner* — Richard T Price, Jr.
(74) *Attorney, Agent, or Firm* — Avery N. Goldstein; Blue Filament Law, PLLC

(57) ABSTRACT

A portioning-twisting machine for producing cured sausages includes a product portioning element (3) and a twisting element (4) wherein portions are stuffed into a continuous casing and they are twisted. The portioning element (3) and the twisting element (4) are arranged so that the product moves between them linearly, i.e., without changing direction from when it is introduced into the machine to be portioned to its output forming stuffed units, after being twisted in the casing. The twisting element (4) is actuated in its rotation by a second motor (19), which operates independently from the first motor (10), which actuates the rotation of the portioning element (3). The transmission means (20) that link the second motor (19) to the twisting element (4) are accommodated and protected in a frame (21) provided externally on the side of the housing (2) and includes at least one belt (22).

12 Claims, 3 Drawing Sheets

(56) References Cited

U.S. PATENT DOCUMENTS 8,628,386 B2 * 1/2014 Schafer .............. A22C 13/0003
452/32

* cited by examiner

PORTIONING-TWISTING MACHINE FOR PRODUCING SAUSAGES

FIELD OF THE APPLICATION OF THE INVENTION

The field of application of the present invention falls within the sector of industry dedicated to the manufacture of apparatuses, systems and devices for the production of food products, particularly meat products and more specifically, but without limitation, sausages.

BACKGROUND OF THE INVENTION

As is known, most sausage products are presented and marketed in strings of portioned units, in variable quantity, yet all having practically identical weight and size, obtained by introducing the product into a casing made of intestine or another similar product suitable for human consumption, which gives them their characteristic appearance, which can vary in diameter and length depending on the type of product, all of this being prepared with the help of stuffing machines, from which the product emerges stuffed in a continuous casing, subsequently carrying out the twisting of the same in order to separate the different units or portions.

In order to carry out said twisting, a known device, disclosed under Utility Model U200900984, which is owned by the applicant of the present invention, enables said operation to be carried out automatically, since in past practice this operation was carried out by hand in traditional manner.

Utility Model U200900984 discloses a motorized portioning-twisting device for the production of sausages, which is constituted by a portioning element wherein the portioning of the product is carried out, and a twisting element, wherein the portions are stuffed into the intestine casing and twisted, thereby separating and defining the different units, both elements being driven by the same single reducer motor with which the machine is equipped.

The object of the present invention is therefore to develop an improved machine of the same type, since the present device has a number of limitations and aspects capable of being improved, particularly due, on the one hand, to the said aforementioned existence of a single motor for the operation of both portioning and twisting elements and, on the other hand, due to the relative arrangement thereof, and which determines a right-angled path of the product in order to pass from the intake conduit located on the side of the machine body, up to the rotation head located at the top.

Particularly, the main limitation of the existence of a single motor for moving both elements is given by the fact that it prevents carrying out independent control between the rotation of the piston which determines introduction of the product in each portion, and the rotation of the head which determines the twisting of the portions, since they always rotate at the same time. But, in particular, this simultaneous rotation prevents adjusting the number of revolutions of the shaft of the twisting head, since its rotation can only be modified by means of gears. It is also impossible to implement an offset or waiting time between the forming of the portion and the twisting action, so the length of the portions is also very limited to the size of the elements involved.

Another problem posed by said angular arrangement is the complexity of maintenance and cleaning operations, in addition to being liable to present major operating problems if the product is not sufficiently minced, which also limits the use of the device in certain types of sausages, for examples country sausages or others which contain larger-sized pieces of meat, making it only suitable for Frankfurt-type sausages.

On the other hand, and as a reference to the current state of the art, it should be noted that, as far as the applicant is concerned, they are not aware of the existence of any other machine or invention with a similar application, having the same or similar technical or structural characteristics to those claimed herein.

SUMMARY OF THE INVENTION

The invention, as stated in the title of the present specification, relates to a portioning-twisting machine for producing sausages, which provides its intended use with advantages and novelty characteristics that will be described in detail below and which represent a remarkable improvement in the current state of the art.

The object of the present invention lies in a motorized machine of the type intended to perform the final stages in the processing of sausages that are presented in identical portions, for example sausages, specifically defining the portions and stabilizing the same by twisting the intestine casing or similar material into which the product is stuffed and which basically comprises a portioning element, wherein the portioning of the product takes place, and a twisting element, wherein the portions are stuffed into the intestine casing and twisted, thereby separating and defining the different units of the sausage, essentially differentiated in that said two elements are arranged so that the product moves between them linearly, which provides important advantages, such as improving the appearance of the product and avoiding operational problems, and each of said elements being driven by independent motors, which enables a more versatile regulation of its operation.

DESCRIPTION OF THE DRAWINGS

As a complement to the description provided herein, and for the purpose of helping to make the characteristics of the invention more readily understandable, the present specification is accompanied by a set of drawings constituting an integral part of the same, which, by way of illustration and not limitation, represent the following.

DESCRIPTION OF THE INVENTION

Figure 1:
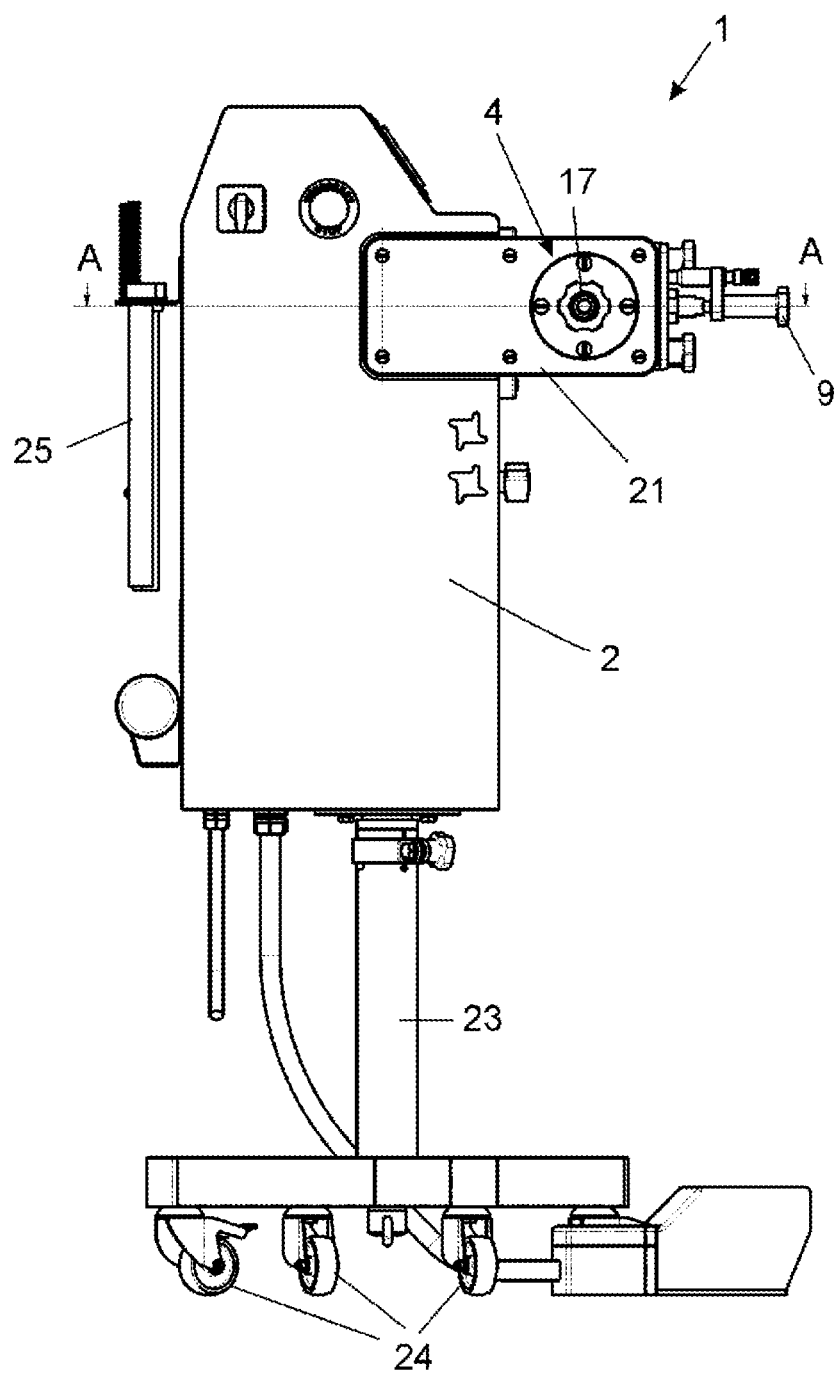
FIG. 1 shows a side elevation view of an exemplary embodiment of the portioning-twisting machine for producing sausages, object of the invention, in which the general outer configuration can be seen.

The portioning-twisting machine for producing sausages proposed by the invention is therefore a novelty within its field of application, since by employing it, the aforementioned objectives can be satisfactorily achieved, the characterizing details that make it possible and set it apart being duly recorded in the claims included at the end of the present specification.

What the invention proposes, as mentioned above, is a machine intended to carry out product portioning operations and twisting of the casing, either intestine or a similar material, into which the portioned product is stuffed, which being of the type comprising a portioning element wherein the portioning of the product takes place and a twisting element wherein the casings are filled with the portions, and these are twisted, being differentiated by having said elements arranged in such a way that the product moves between them linearly and does not have to undergo changes of direction from its introduction into the machine to be portioned until its output forming stuffed units after being twisted in the casing used for filling the portions, as is the case in currently known systems, such that it advantageously improves the appearance of the product, reduces work pressure, avoids operational problems with different types of product and facilitates cleaning.

Furthermore, according to a secondary characteristic of the machine of the invention, it also has independent motors for the portioning element with respect to the twisting element, which provides the advantage of enabling independent control of the speed of the portioning piston and the twisting head, which said elements have, and, specifically, it enables adjusting the number of revolutions of the twister. At the same time, it also provides the advantage of enabling the adjustment of an offset or waiting time between forming the portion and the twisting action.

The described portioning-twisting machines for producing sausages therefore consists of an innovative structure with characteristics heretofore unknown for its intended purpose, reasons which, taken together with its usefulness, provide it with sufficient grounds for obtaining the requested exclusivity privilege.

PREFERRED EMBODIMENT OF THE INVENTION

In light of the aforementioned figures, one may observe therein a non-limiting embodiment of the portioning-twisting machine for producing sausages of the invention, which comprises the parts and elements indicated and described in detail below in accordance with the following numbering:
1. machine
2. housing
3. portioning element
4. twisting element
5. body
6. front cover
7. back cover
8. piston
9. adjusting screw
10. first motor
11. side openings
12. interior spaces
13. central wall
14. product inlet
15. supply conduit
16. product outlet
17. head
18. funnel
19. second motor
20. transmission means
21. frame
22. belt
23. support
24. wheels
25. accessories As can be seen in said figures, the machine (1) in question is thus configures in known manner, based on a housing (2) accommodating an assembly of motorized parts and mechanisms that determine a portioning element (3), wherein the portioning of the product takes place, and a twisting element (4) wherein the portions are stuffed into a continuous casing made of intestine or similar, and these are twisted in order to separate and define the different units of stuffed product.

In order to do this, the portioning element (3), basically, is configured by a hollow body (5) with at least one front cover (6) and one back cover (7) and a piston (8), which moves axially in its interior space being pushed through an externally accessible adjusting screw (9), fixing its position in said space, and which rotates on its axial axis actuated by means of a first motor.

Said piston (8), in a manner that is still known, has side openings (11) giving access to respective interior spaces (12) separated from each other by a central wall (13), the openings of which coincide with each other when the piston (8) is rotated, alternately, with the inlet of the product (14) to be portioned, which is introduced into the machine through a product supply conduit (15) provided for that purpose on one side of the body (5), and the outlet of the portioned product (16) being provided at another point of said body (5) for introducing into the twisting element (4).

The twisting element (4) comprises a head (17) and a funnel (18) containing the casing, which can rotate in an interdependent way on its axial axis in order to ensure the twisting thereof with the product contained therein defining the sausage units.

From this already known configuration, the machine (1) is differentiated by the fact that the portioning element (3) and the twisting element (4) have an arrangement in which the product moves between them linearly, i.e., it does not undergo changes of direction from the time it is introduced into the machine to be portioned to when it reaches the outlet forming the sausage units after having been twisted in the casing.

For this purpose, the product inlet (14) and the product outlet (15) provided in the body (5) of the portioning element (3) are arranged in diametrically opposite points of said body (5) and, consequently, the supply conduit (15) is preferably located on one side of the body (5) while the head (17) of the twisting element (4) is located on the opposite side of said body.

In addition, preferably, this head (17) of the twisting element (4) is actuated in its rotation through a second motor (19), which operates independently from the motor (10) that actuates the rotation of the piston (8) of the portioning element (3).

Figure 2:
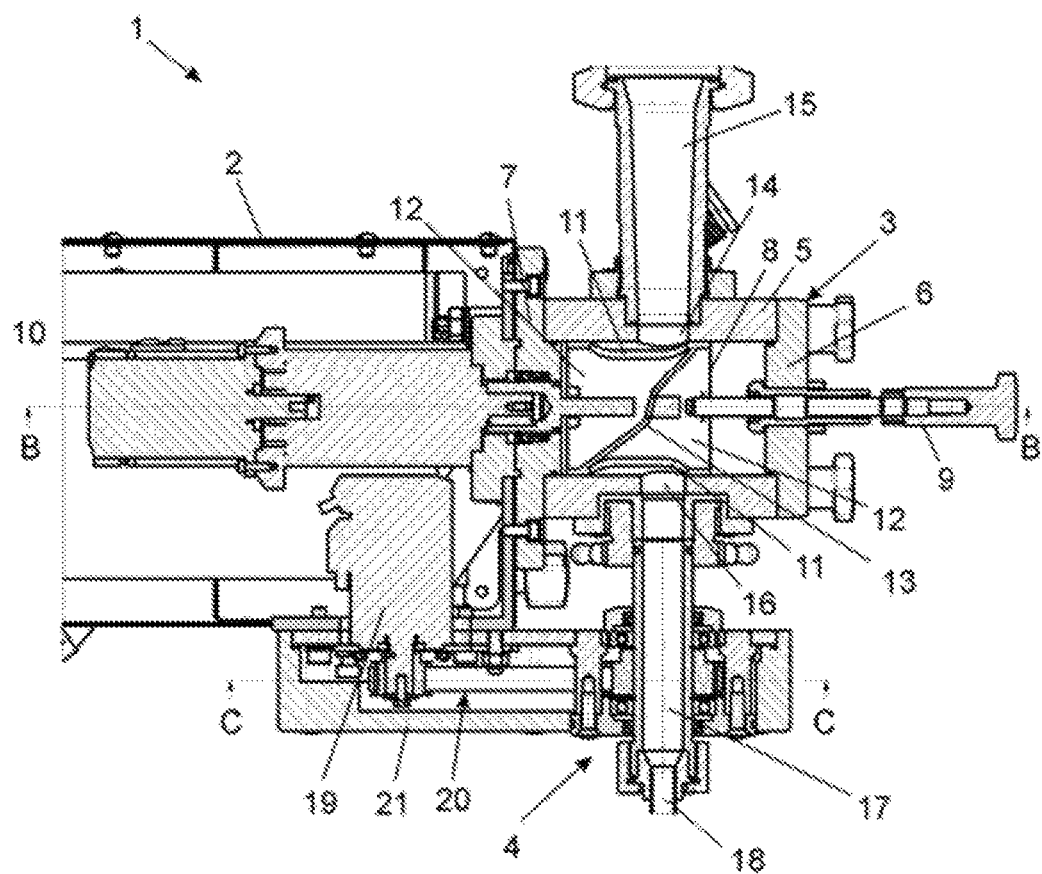
FIG. 2 shows a sectional view of the machine of the invention according to the A-A cut shown in FIG. 1, in which the main parts and pieces it comprises can be seen, specifically those of the portioning and twisting elements, as well as the configuration and arrangement thereof.
Figure 3:
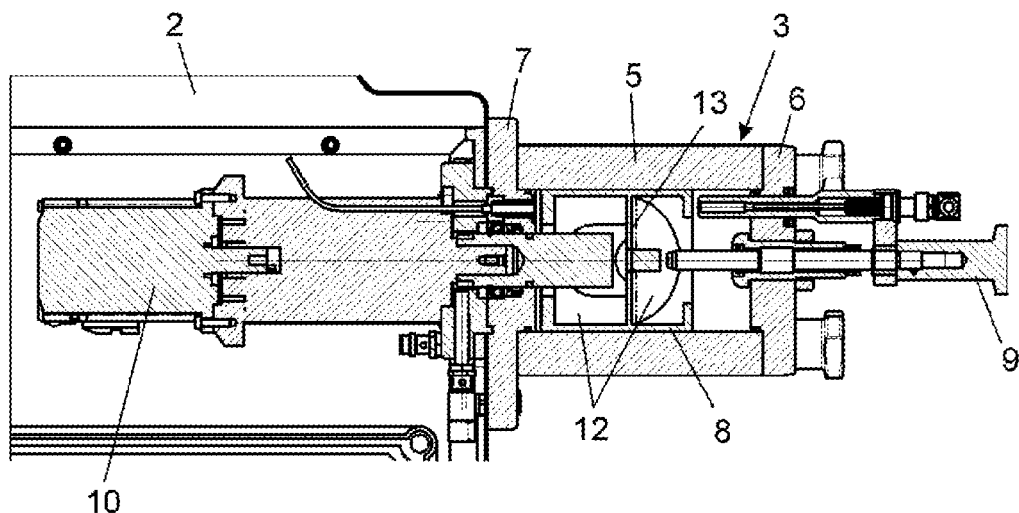
FIG. 3 shows a view of section B-B indicated in FIG. 2, showing, from another perspective point, the main parts and pieces of the portioning element; and, FIG. 4 shows a view of section C-C also indicated in FIG. 2, showing, in this case, the transmission means of the independent actuation of the twisting element.
Figure 4:
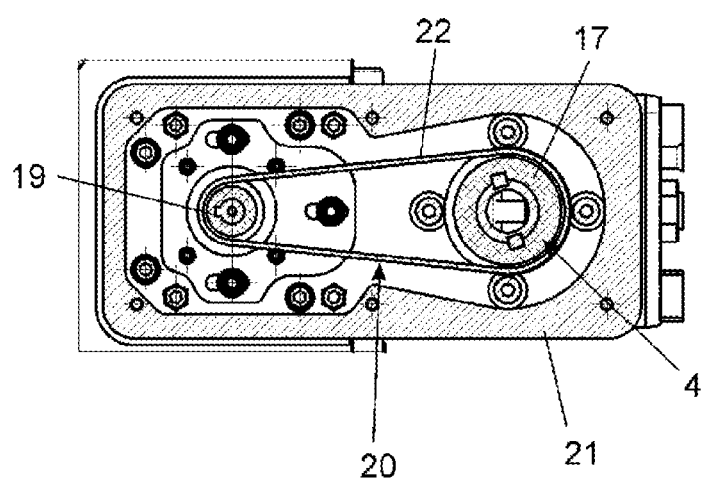

As seen in FIG. 2, this second motor (19), which actuates the head (17), is incorporated into the housing (2) of the machine and is linked to the head (17) through transmission means (20) accommodated and protected in a frame (21) provided for that purpose externally on the side of side of said housing (2), which enables easy access thereto from the exterior for maintenance operations, comprising, as shown in FIG. 4, at least one belt (22), which transmits the movement of the shaft of said motor (19) to said head (17).

Lastly, it should be mentioned that in the example represented, the housing (2) stands on a support (23), which is adjustable and has wheels (24) that facilitate moving and coupling it to the machine that processes the product (not shown), and support means have also been provided for fixing accessories (25) and other elements.

Having sufficiently described the nature of the present invention, as well as the ways of implementing it, it is not considered necessary to extend its explanation for any person skilled in the state of the art to understand its scope and the advantages which arise from it, specifying that, within its essence, it can be carried out in other embodiments that differ in detail from the one provided by way of example, and which are also covered by the requested protection, provided that they do not alter, change or modify its fundamental principle.

The invention claimed is:

1. A portioning-twisting machine for producing sausages comprising a product portioning element (3) and a twisting element (4) wherein portions of a product are stuffed into a continuous casing and are twisted in order to separate and define different units of stuffed product, characterized in that said portioning element (3) and said twisting element (4) are arranged so that the product moves between them linearly from a supply conduit into which the product is fed to a funnel from which the units of stuffed product emerge after being twisted in the casing.

2. The portioning-twisting machine for producing sausages according to any claim 1, characterized in that rotation of the portioning element (3) is actuated by a first motor (10) and rotation of the twisting element (4) is actuated by a second motor (19), which operates independently from the first motor (10).

3. The portioning-twisting machine for producing sausages according to claim 2, characterized in that the second motor (19) that actuates the twisting element (4) is incorporated into a housing (2) of the machine and is linked to the twisting element (4) through a transmission (20).

4. The portioning-twisting machine for producing sausages according to claim 3, characterized in that the transmission (20) that links the second motor (19) to the twisting element (4) is accommodated and protected in a frame (21) provided externally on a side of the housing (2).

5. The portioning-twisting machine for producing sausages according to claim 3, characterized in that the transmission (20) that links the second motor (19) to the twisting element (4) comprises, at least, one belt (22) which transmits the movement of a shaft of the second motor (19) to said twisting element (4).

6. The portioning-twisting machine for producing sausages according to claim 2, characterized in that a transmission (20) that links the second motor (19) to the twisting element (4) comprises, at least, one belt (22) which transmits the movement of a shaft of the second motor (19) to said twisting element (4).

7. A portioning-twisting machine for producing sausages, said portioning-twisting machine comprising a product portioning element (3) and a twisting element (4) wherein portions of a product are stuffed into a continuous casing and are twisted in order to separate and define different units of stuffed product, characterized in that rotation of the portioning element (3) is actuated by a first motor (10) and rotation of the twisting element (4) is actuated by a second motor (19), which operates independently from the first motor (10).

8. The portioning-twisting machine for producing sausages according to any claim 7, characterized in that said portioning element (3) and said twisting element (4) are arranged so that the product moves between them linearly from a supply conduit into which the product is fed to a funnel from which the units of stuffed product emerge after being twisted in the casing.

9. The portioning-twisting machine for producing sausages according to claim 8, characterized in that a transmission (20) that links the second motor (19) to the twisting element (4) comprises, at least, one belt (22) which transmits the movement of a shaft of the second motor (19) to said twisting element (4).

10. The portioning-twisting machine for producing sausages according to claim 7, characterized in that the second motor (19) that actuates the twisting element (4) is incorporated into a housing (2) of the machine and is linked to the twisting element (4) through a transmission (20).

11. The portioning-twisting machine for producing sausages according to claim 10, characterized in that the transmission (20) that links the second motor (19) to the twisting element (4) is accommodated and protected in a frame (21) provided externally on a side of the housing (2).

12. The portioning-twisting machine for producing sausages according to claim 10, characterized in that the transmission (20) that links the second motor (19) to the twisting element (4) comprises, at least, one belt (22) which transmits the movement of a shaft of the second motor (19) to said twisting element (4).

* * * * *